US012283682B2

(12) United States Patent
De Wilde et al.

(10) Patent No.: US 12,283,682 B2
(45) Date of Patent: Apr. 22, 2025

(54) THERMAL BLOCKING SHEET

(71) Applicant: Illinois Tool Works Inc., Glenview, IL (US)

(72) Inventors: Ignatius De Wilde, Rotterdam (NL); Jurgen Gebhard, Wuppertal (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/368,406

(22) Filed: Jul. 6, 2021

(65) Prior Publication Data
US 2022/0013825 A1 Jan. 13, 2022

(30) Foreign Application Priority Data

Jul. 7, 2020 (EP) .................................... 20184484
Jul. 7, 2020 (EP) .................................... 20184494
Jun. 16, 2021 (EP) .................................... 21179805

(51) Int. Cl.
*H01M 10/658* (2014.01)
*H01M 10/613* (2014.01)
*H01M 10/625* (2014.01)
*H01M 10/647* (2014.01)
*H01M 50/249* (2021.01)
*H01M 50/289* (2021.01)

(52) U.S. Cl.
CPC ....... *H01M 10/658* (2015.04); *H01M 10/613* (2015.04); *H01M 10/625* (2015.04); *H01M 10/647* (2015.04); *H01M 50/249* (2021.01); *H01M 50/289* (2021.01); *H01M 2220/20* (2013.01)

(58) Field of Classification Search
CPC .......... H01M 10/658; H01M 2220/20; H01M 50/289; H01M 50/249; H01M 10/647; H01M 10/625; H01M 10/613
See application file for complete search history.

(56) References Cited

U.S. PATENT DOCUMENTS

| 8,481,191 B2 * | 7/2013 | Hermann | H01M 50/293 |
| | | | 429/100 |
| 2005/0232827 A1 * | 10/2005 | Merry | F01N 3/2857 |
| | | | 428/920 |
| 2013/0237621 A1 * | 9/2013 | Kwak | H01M 10/613 |
| | | | 521/59 |
| 2015/0367603 A1 * | 12/2015 | Guandalini | B32B 15/095 |
| | | | 156/60 |
| 2020/0055275 A1 * | 2/2020 | Yao | E04B 1/942 |

FOREIGN PATENT DOCUMENTS

| EP | 3511158 | | 7/2019 |
| JP | 2019096410 A | * | 6/2019 |
| WO | 2020004433 | | 1/2020 |

OTHER PUBLICATIONS

Translation JP2019096410A) Egusa (Year: 2019).*
European Office Communication with Extended Search Report Appln No. 21179805.3 dated Dec. 1, 2021.

* cited by examiner

*Primary Examiner* — Anca Eoff
(74) *Attorney, Agent, or Firm* — McAndrews, Held & Malloy, Ltd.

(57) ABSTRACT

A thermal blocking sheet for reducing the spread of fire or heat, the thermal blocking sheet comprising a first layer and a second layer of expandable graphite. If the thermal blocking sheet is exposed to heat exceeding a threshold temperature the expandable graphite is configured to expand.

14 Claims, 3 Drawing Sheets

THERMAL BLOCKING SHEET

RELATED APPLICATIONS

The present application claims the benefit of European Patent Application No. 21179805.3, filed Jun. 16, 2021, and to European Patent Application No. 20184494.1, filed Jul. 7, 2020 and European Patent Application No. 20184484.2, filed Jul. 7, 2020. The entireties of European Patent Application Nos. 21179805.3, 20184494.1 and 20184484.2 are incorporated herein by reference.

FIELD OF THE DISCLOSURE

This disclosure relates generally to a thermal blocking sheet. Particular examples of the present disclosure relate to using a thermal blocking sheet within a battery to limit the spread of excess heat or fire, however the present disclosure is not limited to this. Further examples of the present disclosure relate to using a thermal blocking sheet within a battery to limit the spread of excess heat or fire. Other examples relate to the use of a thermal blocking sheet between or adjacent to other flammable components or components prone to overheating, for instance a photovoltaic cell. Further examples of the present disclosure relate to the use of a thermal blocking sheet to prevent the spread of excess heat or fire, where the thermal blocking sheet is not applied directly to a potential source of heat or fire, for instance the use of a thermal blocking sheet in a building structure to prevent the fire spreading further.

BACKGROUND

It is known that in certain situations a battery may over heat, and possibly catch fire. Lithium-ion batteries are particularly susceptible to this; however the issue may arise with other battery types. Lithium-ion batteries are increasingly being used to power electric road vehicles, and it will be appreciated that in such a situation a large number of cells may be packed into a relatively small volume, which increases the risk of overheating. Known techniques for mitigating this risk of overheating or fire fall essentially into two types. A first type comprises controlling the battery or the cell to avoid the risk of overheating in the first place, for instance by limiting charging current to a battery within acceptable limits. A second type comprises incorporating structures into or around the battery to manage an overheating event, for instance by constraining overheating to a single cell which may then be replaced.

A known battery cell level approach to improve battery safety is to use materials with intrinsically better thermal properties in the construction of the cell. This may include flexible ceramic separators within a battery cell to limit the spread of overheating through the cell and to prevent separator failure, which could lead to an uncontrolled cell overheating event.

A known battery module level approach is to design battery modules so that it is difficult for heat to be transferred between the cells. This can include having open space between the cells (for instance around 1.4 mm, which also accommodates typical cell expansion), using heat shields or insulators (such as Formex or a mica layer), cooling plates, heat conductors and flame-retardant barriers.

A known battery pack level approach is to apply similar techniques noted above for the battery module to the whole battery pack, for instance heat transfer barriers between modules, strategic vents in the battery pack wall and having dedicated cooling systems. A large battery system can be divided into several smaller packs that are thermally isolated from one another, which guards against the risk of large-scale thermal blocking.

Despite considerable research into the fire risk for lithium-ion batteries, the problem has not been fully resolved and fires continue to occur, risking harm to vehicle occupants when the batteries power an electric vehicle, along with property damage.

It is an aim of certain examples of the present disclosure to provide an improved technique for guarding against the risk of fire or uncontrolled overheating for a battery. Additionally, certain examples of the present disclosure provide thermal blocking sheets that may be used in any situation where component overheating may result in damage to additional structures, for instance in connection with photovoltaic cells. Additionally, certain examples of the present disclosure provide thermal blocking sheets to limit the spread of heat or fire, for instance through a building.

SUMMARY

According to a first aspect of the present disclosure there is provided a thermal blocking sheet for reducing the spread of fire or heat, the thermal blocking sheet comprising: a first layer; and a second layer of expandable graphite; wherein if the thermal blocking sheet is exposed to heat exceeding a threshold temperature the expandable graphite is configured to expand.

The first layer may be configured to compress, deform or melt to accommodate the expanded graphite.

The first layer may comprise a layer of cloth, felt or foam and the layer of expandable graphite is applied to one side of the substrate.

The first layer may comprise a layer of foam configured to compress or melt if the thermal blocking sheet is exposed to heat exceeding the threshold temperature and the thermal blocking sheet may further comprise a barrier layer between the foam layer and the expandable graphite layer.

According to a second aspect of the present disclosure there is provided a thermal blocking sheet for reducing the spread of fire or heat, the thermal blocking sheet comprising: a first and second containment layers; and a layer of expandable graphite between the first and second containment layers; wherein if the thermal blocking sheet is exposed to heat exceeding a threshold temperature the expandable graphite is configured to expand and the first and second containment layers are configured to contain the expanded graphite.

At least one of the first and second containment layers may be flexible to accommodate the expanded graphite.

At least one of the first and second containment layers may comprise a layer of cloth, felt or foam.

The first and second containment layers may partially or wholly surround and contain the layer of expandable graphite.

The thermal blocking sheet according to any one of the preceding claims, may further comprise at least one layer of adhesive for securing additional material layers to the expandable graphite, or for securing the thermal blocking sheet to another component.

The thermal blocking sheet may be provided as a self-adhesive tape or sheet.

According to a third aspect of the present disclosure there is provided a battery comprising: a plurality of cells; and a thermal blocking sheet as described above between a pair of cells.

The battery may further comprise at least one spacer configured to preserve an expansion gap between the pair of cells to permit the expansion of the expandable graphite.

According to a fourth aspect of the present disclosure there is provided a method of manufacturing a thermal blocking sheet, the method comprising: providing a substrate; painting, spraying, printing or otherwise applying a solvent including expandable graphite to the substrate; and drying the solvent to leave the expandable graphite adhered to the substrate; wherein if the thermal blocking sheet is exposed to heat exceeding a threshold temperature the expandable graphite is configured to expand.

The substrate may be configured to compress or melt to accommodate the expanded graphite.

According to a fifth aspect of the present disclosure there is provided a method of manufacturing a thermal blocking sheet, the method comprising: applying expandable graphite between first and second containment layers; wherein if the thermal blocking sheet is exposed to heat exceeding a threshold temperature the expandable graphite is configured to expand and the first and second containment layers are configured to contain the expanded graphite.

According to a sixth aspect of the present disclosure there is provided the use of an expandable thermal blocking sheet to reduce the spread of fire or heat, the expandable thermal blocking sheet comprising expandable graphite configured to expand upon exposure to heat exceeding a threshold temperature, the use comprising: positioning the thermal blocking sheet such that a first side faces a component or area where fire or heat may be generated and a second side faces a component or area to be protected from fire or heat; wherein the thermal blocking sheet includes a first layer configured to support the graphite or compress or melt to accommodate the expanded graphite; or wherein the expandable graphite is applied between first and second containment layers configured to contain the expanded graphite.

The first side may face a cell of a battery or a battery or the thermal blocking sheet may be positioned between a pair of cells in a battery.

The first side may face a photovoltaic cell.

The thermal blocking sheet may be incorporated into or applied to a structure of a building. The structure may be a wall or a door.

The thermal blocking structure may be configured to transition from a rolled or furled position to an open position which closes off an area of a building in the event of a fire.

Thermal blocking sheets according to examples of the present disclosure incorporate expandable graphite which when exposed to a threshold temperature expands and provides thermal insulation to reduce heat transmission. The expansion of the graphite in some examples is facilitated by providing the graphite in a structure that allows for the generation of space when a threshold temperature is reached. This may be through the inclusion of a layer which melts or otherwise reduces in volume when exposed to the threshold temperature or is compressible such that the expanding graphite compresses the layer. In other examples the graphite is contained between containment layers such that upon expansion it is retained in position (and so does not fall or blow away). It will be appreciated that both effects may be provided in combination: for instance a containment layer may also be compressible or configured to melt.

Advantageously, certain examples of the present disclosure use a thermal blocking sheet to limit the spread of heat. In one example, the thermal blocking sheet is used to limit the spread of heat between battery cells.

For the avoidance of doubt, any of the features described herein apply equally to any aspect of the disclosure.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the disclosure, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the disclosure will now be described by way of example only with reference to the accompanying drawings in which.

DETAILED DESCRIPTION

Examples of the present disclosure relate to a thermal blocking sheet, a method of manufacturing a thermal blocking sheet and various uses of a thermal blocking sheet. Particular examples relate to the use of a thermal blocking sheet for controlling the spread of excess heat or fire within a battery, though the present disclosure is not limited to this.

Figure 1:
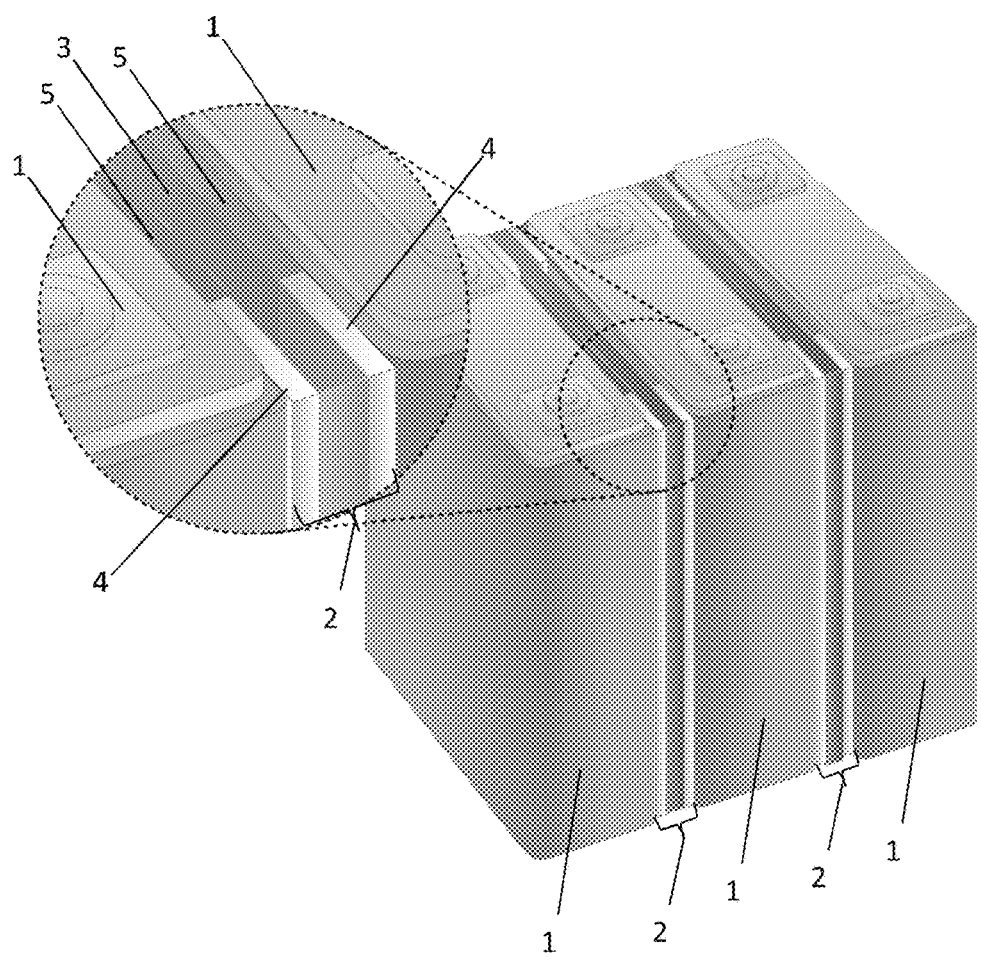
FIG. 1 is a perspective view of a battery including between battery cells thermal blocking sheets according to an example of the present disclosure.

Referring to FIG. 1, this illustrates a battery or a battery module comprising three cells 1. It will be understood that the choice of three cells 1 is arbitrary and there may be two or more cells 1. The cells 1 are illustrated as prismatic battery cells. Prismatic cells have the advantage that their shape permits cells to be tightly packed into a battery module, however the present disclosure is not limited to prismatic cells or any particular cell form. Between each pair of cells 1 there is provided a thermal blocking structure 2. For one pair of cells 1, FIG. 1 includes an expanded view of the thermal blocking structure 2 which allows the details to be more clearly seen. Cells 1 may additionally be stacked in a row with a cooling plate at the end of the row.

Figure 2:
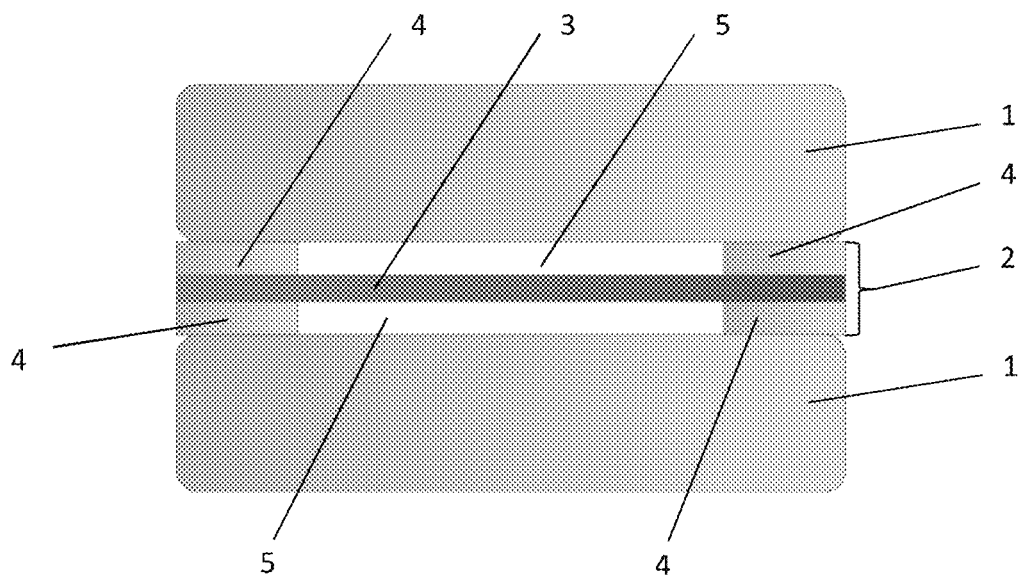
FIG. 2 is a cross sectional view of a pair of battery cells with a thermal blocking sheet according to an example of the present disclosure therebetween.

Thermal blocking structure 2 comprises a thermal blocking sheet 3, generally in the form of a sheet between adjacent cells 1. The term "sheet" should not be used to infer any dimensions: it may be provided in the form of a roll of tape. In FIG. 1 the thermal blocking sheet 3 extends across the full facing areas of adjacent cells 1 though it may be larger or smaller than the adjacent cells 1. Clearly where different forms of cells are used the size and shape of thermal blocking sheet will also vary. In the example of FIG. 1, thermal blocking structure 2 further comprises spacers 4. However, spacers are not required in every example use of the thermal blocking sheet 3. In FIG. 1 these are shown on either side of thermal blocking sheet 3 extending along two sides of the adjacent cells 1. It will be appreciated that the size, shape and extent of spacers 4 will vary so long as they serve the purpose of ensuring an expansion gap 5. In FIG. 1 due to the presence of spacers 4 on both sides of thermal blocking sheet 3, there is an expansion gap 5 on both sides covering the whole surface of the thermal blocking sheet 3 other than the spacers 4. In some situations there may only be an expansion gap on one side. During an overheating event the thermal blocking sheet may expand, for instance by up to 30%, and the expected degree of expansion may determine the choice of size of expansion gap. In other examples of the present disclosure, discussed below, where the thermal blocking sheet 3 includes a substrate or layer that is compressible or arranged to melt to accommodate expansion, it may be that it is not necessary to provide spacers. FIG. 1 illustrates the thermal blocking structure 2 in a normal situation in which neither adjacent cell 1 is overheating. FIG. 2 is a cross sectional view again in a normal situation, which allows the structure of the thermal blocking structure 2 to be more clearly seen. The normal situation may also be considered to be the form of the thermal blocking structure 2 at the start of its life cycle: that is, before exposure to a threshold temperature causing the thermal blocking sheet to expand, as discussed below.

The primary purpose of the spacers 4 is to maintain the expansion gap 5 (though as explained below this is not necessary or desirable for all applications of the present disclosure). The spacers may be formed from a flame retardant, for instance polypropylene and polycarbonate flame retardant electrical insulating materials which are known for use in electrical applications and available from ITW Formex (https://www.itwformex.com/), a division of Illinois Tool Works Inc of Glenview, Ill., US. It is well established that over time, and when exposed to typical operational temperatures, battery cells expand. To accommodate this expansion it is known to preserve a gap between adjacent cells, for instance approximately 1.4 mm. Alternatively, larger gaps may be preserved between every other pair of cells, or less frequently. A further known alternative is to insert a compressible material such as a foam between cells, or in some of the gaps between cells, such that the material is compressed as the cells expand over time. Spacers 4 serve to preserve this expansion gap 5, and as such it will be appreciated that they may be formed from substantially any material, especially those already known in the art for spacing battery cells. Preferably, but not essentially, the spacer material is heat and flame resistant.

As noted above, the spacers 4 serve to preserve an expansion gap 5 on one or both sides of a thermal blocking sheet 3. The thermal blocking sheet 3 comprises a substrate, for instance cloth or foam (but a wide range of substrates may be used, as described below) to which there is applied expandable graphite (on one or both sides of the substrate). Graphite is a crystalline form of carbon and is a stable form of carbon. Expandable graphite is a synthesized form of graphite that expands (or exfoliates) when heated. Expandable graphite may include intercalation reagents as a compound with the graphite, which when exposed to a rapid increase of temperature decompose into a gaseous product which results in high inter-graphite layer pressure causing an increase in the volume of the graphite. Expandable graphite is known as a fire-retardant additive. The degree of expansion and the threshold temperature at which the expansion begins may be controlled through selection of the reagents adding during manufacture. In a further example of the present disclosure, spacers are not used such that at normal operating temperatures the thermal blocking sheet 3, for instance the examples of FIGS. 4a to 4e, are in contact with battery cells on both sides. That is, no expansion gap is preserved. In some examples of the present disclosure, the thermal blocking sheet 3 is arranged to resist cell expansion over time or through cell use. That is, the thermal blocking sheet 3 provides back pressure against the cells on either side as they begin to expand. In particular, for the examples of FIGS. 4b, 4c and 4e where a layer of foam 13 is included, the foam 13 may be selected to provide sufficient resistance to crushing as cells begin to expand so as to provide back pressure to the cells mitigating their expansion. At or around the thermal expansion threshold of the graphite 10, the foam melts in order to provide room for the expansion of the graphite. The foam may be formed from a thermoplastic polymer that is selected to have a glass transition temperature and a melting point suitable for the intended application. For instance, the foam may be formed from a material selected to soften, be compressible or melt at or around the threshold temperature at which the graphite layer expands. One suitable material may be a thermoplastic polyurethane (TPU) foam. The skilled person will be able to select suitable materials based on the requirements of the intended application and their common general knowledge.

For use within the thermal blocking structure 2 between battery cells of FIGS. 1 and 2, preferably the threshold temperature is selected to be sufficiently above normal operating temperatures for a battery cell (for instance, 80° C.) but below the point at which the battery cell starts to fail due to the separate layers melting (for instance, 140° C. to 170° C.) and certainly below the point at which the battery cell suffers complete meltdown and catches fire (for instance, 200° C. to 700° C.). This may prevent a runaway or cascade chain reaction for a series of adjacent cells if one overheats or catches fire. The threshold temperature may be in the range of 100° C. to 120° C., by selection of an appropriate form of expandable graphite. It will be appreciated that for other applications of the thermal blocking sheet 3, discussed below, widely different threshold temperatures may be desirable. Additionally, the material properties of the substrate may also affect the threshold, for instance by providing a degree of thermal insulation to the expandable graphite. Once expanded, the graphite is substantially more thermally insulating compared with its unreacted form, and hence may reduce the spread of heat or fire, for instance between adjacent battery cells.

According to an example of the present disclosure, the expandable graphite may be provided in a liquid form by being dissolved or suspended in a solvent. The solvent may be water. A binding agent may also be included, which may aid the adherence of the expandable graphite to a substrate. In certain examples the expandable graphite may bond to a wide range of different surfaces, including metals, glass, textiles, which may be achieved according to the added binding agent, if any. The expandable graphite may thus be painted or otherwise applied (for instance, as a spray, using a roller or applying with a knife) to the substrate and left to dry, at which point the expandable graphite is adhered to the substrate. An alternative option is to use a solvent which is UV curable, which may be cured more rapidly by the application of UV light, compared with a baking process required to dry a substrate when water is used as the solvent. A further alternative technique for applying the expandable graphite is to print it onto the substrate, for instance using screen printing. Further layers may be applied over the expandable graphite, which may require the use of an adhesive. Examples of different constructions of a thermal blocking sheet are given below in connection with FIG. 4.

In certain examples of the present disclosure, the expandable graphite may be blended with other materials. Those materials may comprise additives, including those that may affect the expansion of the graphite. As well, or instead, filler materials may be mixed with the graphite, for instance to lower the cost of the graphite layer. The inclusion of additional materials, blended with the graphite, may be intended to control the temperature threshold at which the graphite expands (for instance, to lower threshold temperature). As an example, it may be desirable to provide the graphite layer in a form that expands at 150° C. While this is achievable using graphite on its own, by appropriation selection of a grade and preparation of graphite, it has been found that the graphite layer once the solvent has dried has a rough surface which is unattractive and may cause problems. To address this, one option is to grind the expandable graphite prior to dissolving in the solvent.

An alternative approach to reducing the expansion threshold temperature of the graphite, while not restricting the choice of type of graphite used, is to combine the graphite with other additive materials. For instance, Expancel may be incorporated. Expancel is known primarily for use to control foaming, for instance in printing textured textiles. Expancel is available from Nouryan Chemicals Holding B.V. of Amsterdam, The Netherlands (https://www.nouryon.com/products/expancel-microspheres/blowing-agents/). Expancel comprises microspheres that burst and expand at a controllable temperature. The incorporation of Expancel has been found to adjust, for instance lower, the expansion threshold temperature for the graphite layer. A further optional material (as well as or instead of Expancel) is siloxane, which is a polymer used as the basis for silicone rubber and adhesives, and also is known to be used on its own for high temperature coatings. The incorporation of siloxane has been found to adjust, for instance lower, the expansion threshold temperature for the graphite layer. In some examples, the combination of graphite, Expancel and siloxane in appropriate proportions allows for finer control over the expansion threshold temperature.

Where reference is made in the present disclosure to a layer of expandable graphite, this should be interpreted as comprising any layer with a majority of expandable graphite by weight, without excluding the possibility of other additives, for instance Expancel or siloxane. The graphite layer may comprise at least 50% expandable graphite by weight or volume prior to expansion), the remaining proportion comprising additives or filler materials. In some examples, the graphite layer comprises at least 75% graphite. This may be at least 90% graphite. This may be at least 95% graphite. This may be at least 99% graphite. This may be at least 99.9% graphite. That is, the graphite layer may comprise substantially only graphite other than trace amounts of other materials (whether deliberately or inadvertently included).

Figure 3:
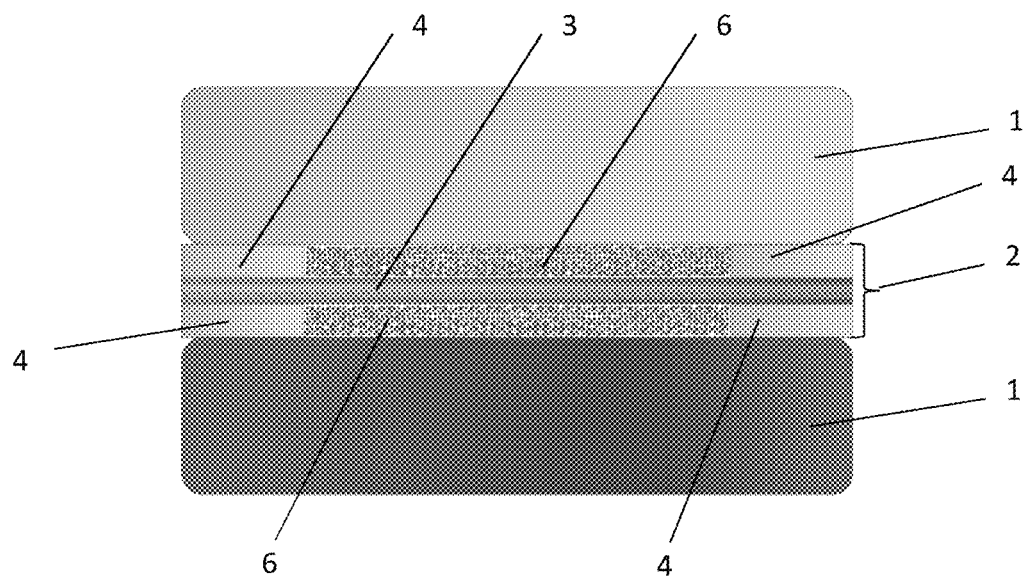
FIG. 3 is an equivalent view to that of FIG. 2 during an overheating event.

Referring now to FIG. 3, this illustrates the same view as FIG. 2 in the event that one of the cells 1, for instance the lower cell 1, has overheated or caught fire. In the event of overheating the thermal blocking sheet 3 expands into the expansion gap. As illustrated, this may be on both sides of the thermal blocking sheet 3 where expansion gaps on both sides are provided through spacers 4. For a particular thermal blocking sheet 3, when a threshold temperature is reached (selected, as discussed above, according to the intended application through selection of the form and grade of expandable graphite, and optionally the selection of additives to the expandable graphite, and in consideration of the substrate materials), graphite within or upon the thermal blocking sheet 3 expands into the expansion gap 5. FIG. 3 shows the expansion of graphite into the expansion gap on both sides of the thermal blocking sheet, for instance for a thermal blocking sheet 3 having expandable graphite applied to both sides. However, it will be appreciated that in other examples, graphite may be applied to and expand from only a single side of the thermal blocking sheet 3. In the latter case, where an expansion gap 5 is preserved on both sides of the sheet 3, the expansion of the graphite may cause the substrate to be pushed into the opposite expansion gap such that effectively the expanded graphite fills both gaps.

The expanded graphite, labelled 6, serves to reduce the transfer of heat across the thermal blocking structure 2 by being more thermally insulating than the original thermal blocking sheet prior to the expansion of the graphite. For certain examples of the thermal blocking sheet 3, when subjected to a heat source above a threshold temperature, the expansion of the graphite may take place of a period of time before it is fully expanded, for instance over 10 minutes when subjected to 200° C. The time taken to fully expand may be controlled through selection of the graphite material and optionally additives, the quantity of the expandable material included within thermal blocking sheet 3, and the other materials used in the construction of the thermal blocking sheet. In certain examples, the required performance for the thermal blocking structure may be to resist heat transfer within cells for upwards of 10 minutes when one side is exposed to 1000° C. In certain situations the required thermal performance may be to ensure that cells adjacent to an overheating cell (which may reach 700° C.) do not reach 200° C. for at least 5 minutes or 10 minutes.

While FIGS. 1 to 3 illustrate the thermal blocking structure 2 between pairs of battery cells 1, the present disclosure is not limited to this. The same structure may be used between battery modules forming a battery system and each comprising a plurality of cells. The same structure may also be used surrounding a battery system. For the example of an electric vehicle the thermal blocking structure may thus be used to isolate a battery system from other parts for the vehicle, and from a passenger compartment in particular. While electric vehicles are specifically mentioned in the above description, it will be appreciated that the present disclosure is equally suited to thermal protection for batteries in combustion engine vehicles, or indeed any other form of battery.

Furthermore, the same thermal blocking sheet (optionally with spacers and expansion gaps) may be used for protecting essentially any other structure where one component is at risk of overheating and there is a requirement to prevent excessive heat transfer to other structures. One example of this may be where a photovoltaic cell is fixed to a building, and there is a need to protect the building in the event that the photovoltaic cell overheats. Another example would be for fire protection within a building. A thermal blocking sheet may be applied to or within a building structure. For example, a thermal blocking sheet may be applied to a front or reverse surface of a plasterboard wall such that in the event of a fire on one side of the wall the graphite expands (for instance into an air gap within the wall) to reduce the transfer of heat through the wall. A further example application for the thermal blocking sheet is to form a flexible fire door or shutter. In the event of a fire being detected a flexible fire door or shutter may be deployed (for instance, unrolled or unfurled) across an opening such as a corridor to prevent the spread of fire. Openings, such as slits, may be preserved in the flexible sheet to allow people to pass through.

Referring now to FIGS. 4a to 4e, examples of the thermal blocking sheet 3 will now be described in more detail. Four exemplary constructions of the thermal blocking sheet 3 are illustrated in cross section. Alternative constructions will be apparent to the skilled person, for instance including additional similar layers or alternative additional layers which may be required according to the particular application intended. It will be appreciated that given that the expandable graphite when mixed with a solvent may be applied to substantially any substrate (beyond those where adhesion is difficult, for instance PTFE) the examples of FIGS. 4a to 4d are illustrative of effectively limitless possibilities.

Figure 4A:
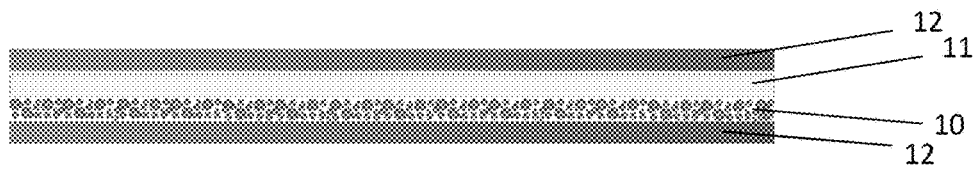
FIGS. 4a to 4e are cross sectional views of different thermal blocking sheets according to different examples of the present disclosure.

FIG. 4a illustrates a first example of the thermal blocking sheet 3 comprising a graphite layer 10 and an adhesive layer 11 surrounded by a pair of glass cloth layers 12. The adhesive 11 may be water based and configured to adhere to all base materials, including fiberglass, textile, aluminum and other metals. The particular material chosen will be selected according to the materials forming the substrate for the thermal blocking sheet, as well as any material that the thermal blocking sheet will be adhered to. The graphite layer 10 comprises expandable graphite as described above that when subjected to heat permits the graphite to expand. The thermal blocking sheet of FIG. 4a may be manufactured by painting or otherwise applying the solvent and graphite mix to the lower cloth layer 12 and then either drying or UV curing the expandable graphite so that it adheres to the cloth. The adhesive layer 11 is then applied over the expandable graphite 10 so as to attach the upper cloth layer 12 (or the adhesive may first be applied to the cloth). A further alternative is that the upper cloth layer 12 is applied to the expandable graphite layer 10 before it has fully dried so that it adheres to both cloth layers without the need for an adhesive.

In FIG. 4a the glass cloth layers 12 comprises containment layers that retain the expanded graphite when exposed to an overheating event or fire (as well as providing a substrate to support the graphite). This prevents the expanded graphite from blowing or falling away, or otherwise being disturbed. As such at least one layer 12 may be flexible to accommodate the expansion of the graphite. Other suitable containment layer materials will be apparent to the skilled person. In other examples the graphite may be contained between a first, generally rigid layer and a second, flexible containment layer. The glass cloth layers may comprise an enclosed cloth bag surrounding the graphite layer 10. The glass cloth layers 12 may comprise a pouch that may entirely surround the graphite layer 10, or the pouch may be open along at least one edge. The glass cloth layer may additionally provide further heat resistance allowing the thermal blocking sheet 3 to withstand higher temperatures and also flames.

Figure 4B:
Figure 4C:
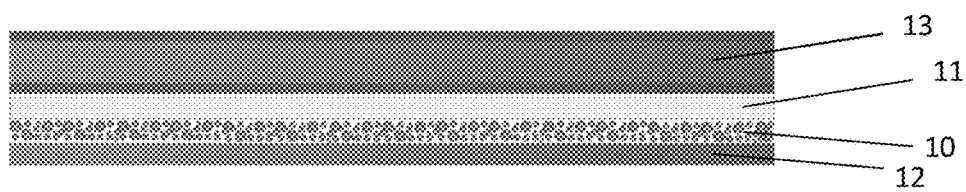
Figure 4D:
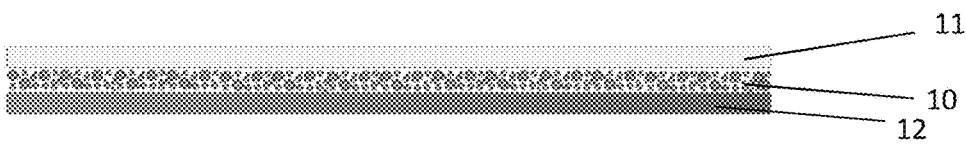

In some situations and applications only a single glass cloth layer 12 may be provided, as shown in FIG. 4d. In FIG. 4d the adhesive layer serves to allow the thermal blocking sheet to be applied to another component (for instance a surface of a battery cell, or between a battery cover and battery cells, or a wall in a building). Containment of the expanded graphite may be achieved between the other component to which the sheet is applied and the glass cloth layer 12. This may be desirable in a situation in which the thermal blocking sheet 3 is applied to a surface of a structure that it is expected that expansion will take place only in a single direction. It will be appreciated that the thermal blocking sheet of FIG. 4a may also include a second, outer adhesive layer on one or other side in order to hold the thermal blocking sheet in place in its intended application. In some examples the outer adhesive layer may be provided with a temporary backing such that the thermal blocking sheet may be applied as a tape or adhesive sheet by first removing the temporary backing.

FIG. 4b illustrates an alternative thermal blocking sheet 3 in which a graphite layer 10 is applied (for instance, painted on) to a foam layer 13. Although no adhesive layer is shown, one may be provided on the side of the foam layer opposite the graphite layer for positioning the thermal blocking sheet. The foam layer 13 serves to provide space for the graphite to expand into, either by being compressible or by melting upon exposure to the threshold temperature. Other suitable materials for layer 13 will be known to the skilled person.

FIG. 4c illustrates a further alternative which is generally similar to FIG. 4a except that the upper glass cloth layer has been replaced by a foam or fleece layer. A foam or fleece layer may act as a spacer, thus removing the need for a separate spacer as illustrated in FIGS. 1 to 3. The graphite may expand into (or compress) the foam when subjected to heat. The foam 13 may also be considered to comprise a containment layer for containing the expanded graphite, together with the cloth layer 12. As for FIG. 4a the adhesive layer may be dispensed with.

The thermal blocking sheet 3 of FIG. 4c may comprise a fire barrier layer that may be applied to a cover such as a battery cover made from steel or aluminum. This may be achieved by providing an outer adhesive layer on either the foam or the cloth side. The fleece may be approximately 1.5 mm thick.

Figure 4E:
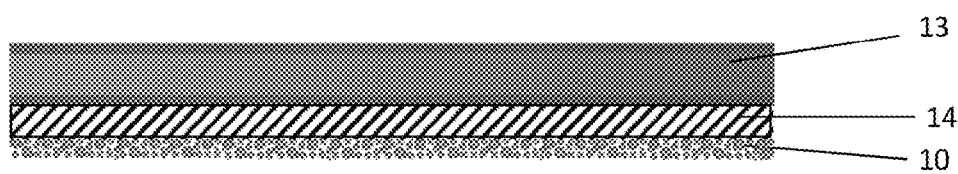

FIG. 4e illustrates a further alternative which is generally similar to FIG. 4b except that a barrier layer 14 is interspersed between foam layer 13 and graphite layer 10. For instance, the graphite layer 10 may be applied to the barrier layer 14 as previously described, through the use of a solvent. The foam layer 13 and barrier layer 14 may be joined with an adhesive (not illustrated). As for the example of FIG. 4b, the purpose of the foam layer 13 is to compress or melt when the graphite expands under heating. However, the inventors have identified that under some situations melting of the foam (for instance, a polyurethane foam) may interfere with the expansion of the graphite if they are in direct contact. The addition of a barrier layer separating the foam and the graphite prevents this interaction. The barrier layer 14 may comprise a woven glass fiber material. The material may be generally the same as that for the containment layers 12 of FIG. 4a. Any suitable material may be used. In some examples the material selected to form the barrier layer 14 will be one which will not melt at the threshold temperature at which the graphite expands.

In a yet further example, not illustrated, the barrier layer 14 may be positioned between foam layer 13 and graphite layer 10 in the example of FIG. 4c (above or below the adhesive in FIG. 4c, or with adhesive on both sides of the barrier layer 14. It will be appreciated that in substance this comprises a combination of FIGS. 4a (graphite surrounded by containment layers) and FIG. 4b (foam for the graphite to expand into).

The use of a foam layer that is compressible or arranged to melt to facilitate graphite expansion may mean in some examples that the spacers shown in FIGS. 1 to 3 are no longer required (where the thermal blocking sheet is used between components such as cells in a battery).

The thermal blocking sheet 3 comprises a coating material, specifically the graphite layer 10, that may be applied to other materials, for instance the glass cloth layer 12 or fleece or foam layers 13 illustrated in FIGS. 4a to 4e, as described above, for instance by being painted on. The graphite layer 10 may also be called a heat shield coating.

It will be appreciated by those skilled in the art that several variations to the aforementioned embodiments are envisaged without departing from the scope of the disclosure. It will also be appreciated by those skilled in the art that any number of combinations of the aforementioned features and/or those shown in the appended drawings provide clear advantages over the prior art and are therefore within the scope of the disclosure described herein.

Throughout this specification, the words "comprise" and "contain" and variations of them mean "including but not limited to", and they are not intended to (and do not) exclude other components, integers or steps. Throughout this specification, the singular encompasses the plural unless the context otherwise requires. In particular, where the indefinite article is used, the specification is to be understood as contemplating plurality as well as singularity, unless the context requires otherwise. Throughout this specification, the term "about" is used to provide flexibility to a range endpoint by providing that a given value may be "a little above" or "a little below" the endpoint. The degree of flexibility of this term can be dictated by the particular variable and can be determined based on experience and the associated description herein.

Features, integers or characteristics described in conjunction with a particular aspect or example of the disclosure are to be understood to be applicable to any other aspect or example described herein unless incompatible therewith. All of the features disclosed in this specification, and/or all of the steps of any method or process so disclosed, may be combined in any combination, except combinations where at least some of such features and/or steps are mutually exclusive. The disclosure is not restricted to the details of any foregoing examples. The disclosure extends to any novel feature or combination of features disclosed in this specification. It will be also be appreciated that, throughout this specification, language in the general form of "X for Y" (where Y is some action, activity or step and X is some means for carrying out that action, activity or step) encompasses means X adapted or arranged specifically, but not exclusively, to do Y.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The reader's attention is directed to all papers and documents which are filed concurrently with or previous to this specification in connection with this application and which are open to public inspection with this specification, and the contents of all such papers and documents are incorporated herein by reference.

What is claimed is:

1. A thermal blocking sheet for reducing the spread of fire or heat, the thermal blocking sheet comprising:
   a first layer;
   a second layer of expandable graphite;
   a barrier layer between the first layer and the expandable graphite layer; and
   a glass cloth containment layer on an opposite side of the second layer from the barrier layer;
   wherein if the thermal blocking sheet is exposed to heat exceeding a threshold temperature the expandable graphite is configured to expand, wherein the first layer comprises a layer of foam configured to compress or melt if the thermal blocking sheet is exposed to heat exceeding the threshold temperature.

2. A thermal blocking sheet according to claim 1, wherein the first layer is configured to compress, deform or melt to accommodate the expanded graphite.

3. A thermal blocking sheet according to claim 1, wherein the containment layer is flexible to accommodate the expanded graphite.

4. A thermal blocking sheet according to claim 1, further comprising at least one layer of adhesive for securing additional material layers to the expandable graphite, or for securing the thermal blocking sheet to another component.

5. A thermal blocking sheet according to claim 1, wherein the thermal blocking sheet is provided as a self-adhesive tape or sheet.

6. A battery comprising:
   a plurality of cells; and
   a thermal blocking sheet according to claim 1 between a pair of cells.

7. A battery according to claim 6, further comprising at least one spacer configured to preserve an expansion gap between the pair of cells to permit the expansion of the expandable graphite.

8. A thermal blocking sheet for reducing the spread of fire or heat, the thermal blocking sheet comprising:
   a first layer;
   a second layer of expandable graphite;
   a barrier layer between the first layer and the expandable graphite layer; and
   a containment layer on an opposite side of the second layer from the barrier layer;
   wherein if the thermal blocking sheet is exposed to heat exceeding a threshold temperature the expandable graphite is configured to expand, wherein the first layer comprises a layer of foam configured to compress or melt if the thermal blocking sheet is exposed to heat exceeding the threshold temperature, and wherein the containment layer is a non-foaming layer.

9. A thermal blocking sheet according to claim 8, wherein the first layer is configured to compress, deform or melt to accommodate the expanded graphite.

10. A thermal blocking sheet according to claim 8, wherein the containment layer is flexible to accommodate the expanded graphite.

11. A thermal blocking sheet according to claim 8, further comprising at least one layer of adhesive for securing additional material layers to the expandable graphite, or for securing the thermal blocking sheet to another component.

12. A thermal blocking sheet according to claim 8, wherein the thermal blocking sheet is provided as a self-adhesive tape or sheet.

13. A battery comprising:
   a plurality of cells; and
   a thermal blocking sheet according to claim 8 between a pair of cells.

14. A battery according to claim 13, further comprising at least one spacer configured to preserve an expansion gap between the pair of cells to permit the expansion of the expandable graphite.

* * * * *